(12) United States Patent
Leon

(10) Patent No.: US 9,894,263 B2
(45) Date of Patent: *Feb. 13, 2018

(54) HANDHELD MAGNIFIER CAMERA WITH VARIABLE FOCUS DISTANCE

(71) Applicant: Freedom Scientific, Inc., St. Petersburg, FL (US)

(72) Inventor: Robert Leon, Miami, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,029

(22) Filed: Sep. 19, 2016

(65) Prior Publication Data

US 2017/0070667 A1    Mar. 9, 2017

Related U.S. Application Data

(63) Continuation of application No. 14/593,600, filed on Jan. 9, 2015, now Pat. No. 9,451,156.

(60) Provisional application No. 61/925,949, filed on Jan. 10, 2014.

(51) Int. Cl.
| | |
|---|---|
| *H04N 5/232* | (2006.01) |
| *H04N 5/225* | (2006.01) |
| *H04N 5/262* | (2006.01) |
| *G03B 17/04* | (2006.01) |
| *G03B 17/48* | (2006.01) |
| *G02B 13/00* | (2006.01) |
| *G02B 27/02* | (2006.01) |
| *G03B 3/00* | (2006.01) |
| *G02B 7/10* | (2006.01) |
| *G02B 27/00* | (2006.01) |
| *H04N 5/374* | (2011.01) |

(52) U.S. Cl.
CPC ......... *H04N 5/23216* (2013.01); *G02B 7/102* (2013.01); *G02B 13/009* (2013.01); *G02B 27/0075* (2013.01); *G02B 27/025* (2013.01); *G02B 27/026* (2013.01); *G03B 3/00* (2013.01); *G03B 17/04* (2013.01); *G03B 17/48* (2013.01); *H04N 5/2251* (2013.01); *H04N 5/2252* (2013.01); *H04N 5/2253* (2013.01); *H04N 5/2254* (2013.01); *H04N 5/23212* (2013.01); *H04N 5/23293* (2013.01); *H04N 5/23296* (2013.01); *H04N 5/2628* (2013.01); *H04N 5/374* (2013.01); *G03B 2205/0046* (2013.01)

(58) Field of Classification Search
CPC ............. H04N 5/23212; H04N 5/2628; H04N 5/23293; H04N 5/2252; G03B 17/04
See application file for complete search history.

(56) References Cited

U.S. PATENT DOCUMENTS

| | | | |
|---|---|---|---|
| 4,906,076 | A | 3/1990 | Schwartz |
| 7,172,304 | B2 | 2/2007 | Rodriguez et al. |
| 7,352,516 | B2 | 4/2008 | Tsuji |

(Continued)

FOREIGN PATENT DOCUMENTS

JP    2000194045 A    7/2000

*Primary Examiner* — Fayez Bhuiyan
(74) *Attorney, Agent, or Firm* — GrayRobinson, P.A.; Michael J. Colitz, III

(57) ABSTRACT

Disclosed is a magnifier for use by blind or low vision users. The magnifier includes a camera, such as a CMOS image sensor, that displays enlarged images upon a screen for easy viewing. The magnifier further includes a handle that is pivotally interconnected to a housing to allow for handheld use in a variety of different configurations.

8 Claims, 9 Drawing Sheets

(56) References Cited

U.S. PATENT DOCUMENTS

| | | |
|---|---|---|
| 2010/0073545 A1 | 3/2010 | Rodriquez et al. |
| 2013/0208161 A1 | 8/2013 | Yoon et al. |

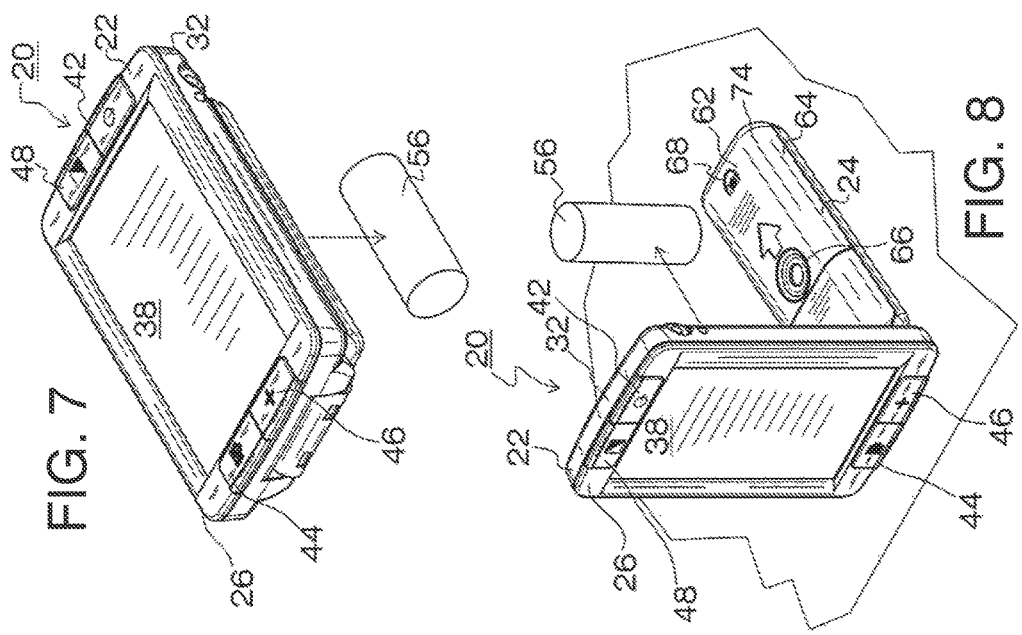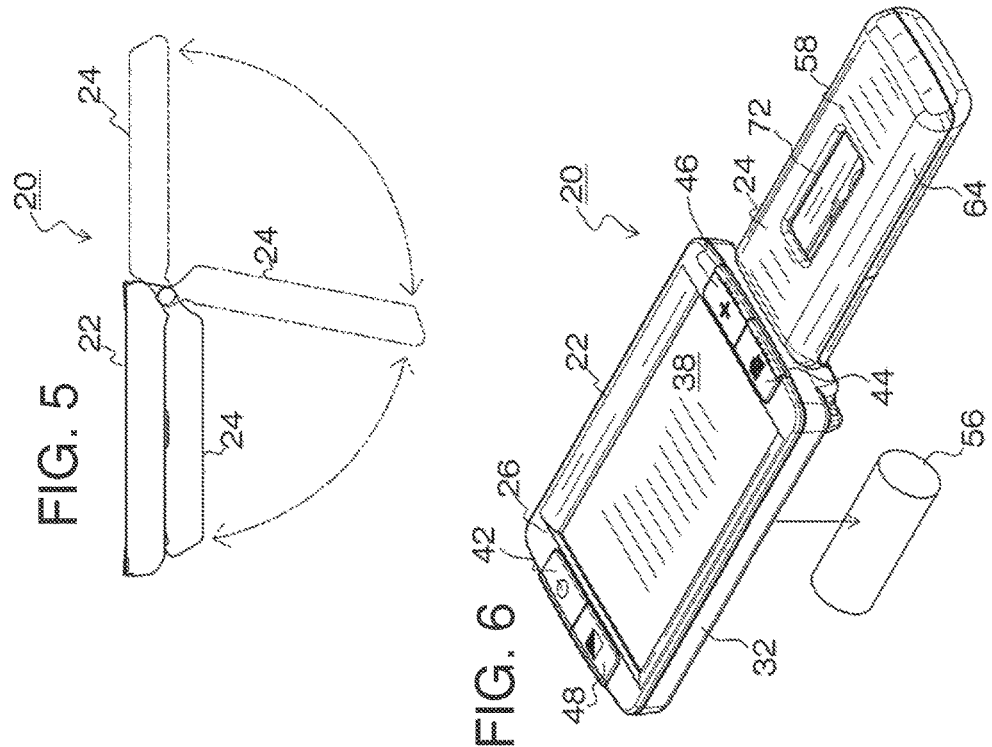

HANDHELD MAGNIFIER CAMERA WITH VARIABLE FOCUS DISTANCE

CROSS REFERENCE TO RELATED APPLICATIONS

This application is a continuation application of U.S. application Ser. No. 14/593,600, filed on Jan. 9, 2015, entitled "Handheld Magnifier Camera with Variable Focus Distance," now U.S. Pat. No. 9,451,156, issued Sep. 20, 2016, which claims priority to U.S. Application Ser. No. 61/925,949, filed Jan. 10, 2014, and entitled "Handheld Magnifier Camera with Variable Focal Length," the contents of which are fully incorporated herein for all purposes.

BACKGROUND OF THE INVENTION

Field of the Invention

This invention relates to a magnification device for individuals with low vision. More particularly, the present invention relates to a handheld magnification device with a variable focus distance.

Description of the Background Art

The use of electronic magnifiers for low vision users is known in the art. These magnifiers typically include an image sensor and a lens that are configured to provide enlarged images of an associated object. One issue with magnifier cameras is depth of field. Depth of field refers to the closest and farthest distances an object can be viewed while maintaining focus. Providing a large depth of field is desirable because it allows users to view objects at various distances without having to refocus the camera. However, depth of field is often lost as the resolution of the sensor is improved. Namely, as a camera's resolution increases, the depth of field decreases. In order to compensate for the loss of depth of field, the focus must be varied. For a lens having a fixed focal length, this can be accomplished by mechanically moving the lens.

What is needed, therefore, is a high resolution magnifier camera with a means for mechanically moving the associated lens. This would permit a higher resolution sensor to be employed without diminishing the perceived depth of field when using the magnifier. The portable multi position magnifier camera of the present invention is directed at fulfilling these needs.

SUMMARY OF THE INVENTION

It is therefore one of the objects of this invention to provide a magnifier camera with a variable focus distance.

Yet another advantage is realized by mechanically changing the focus distance of a lens to thereby provide a wider perceived depth of field.

Still another advantage is achieved by allowing higher resolution optical sensors to be used without sacrificing depth of field.

A further advantage is attained by mechanically changing the focus distance of a lens depending upon the configuration of a camera.

It is therefore one of the objectives of this invention to allow a user to configure a magnifier camera into one of a variety of viewing modes so as to optimize the viewing of different sized objects at differing distances.

It is another objective of this invention to provide a magnifier camera that can either be held in front of an object to be viewed or positioned upon the object to be viewed.

It is yet another objective of this invention to provide a magnifier camera that is hand-held, compact, and readily transportable.

The foregoing has outlined rather broadly the more pertinent and important features of the present invention in order that the detailed description of the invention that follows may be better understood so that the present contribution to the art can be more fully appreciated.

Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5 is a side view illustrating the various orientations of the magnifying apparatus.

FIG. 6 is a view of the magnifying apparatus in its first orientation.

FIG. 7 is a view of the magnifying apparatus in its third orientation.

FIG. 8 is a view of the magnifying apparatus in its second orientation.

Similar reference characters refer to similar parts throughout the several views of the drawings.

PARTS LIST

20 Magnifier Device
22 Housing
24 Handle
26 Front Face (Housing)
28 Back Face (Housing)
32 Peripheral Edge (Housing)

-continued

PARTS LIST

| | |
|---|---|
| 34 | Sensor |
| 36 | Aperture (Housing) |
| 38 | Screen |
| 42 | Power Button |
| 44 | Camera Button |
| 46a/46b | Zoom Button |
| 48a/48b | Mode Control Button |
| 52 | LEDs |
| 54 | Focal Point |
| 56 | Object Being Viewed |
| 58 | Front Face (Handle) |
| 62 | Back Face (Handle) |
| 64 | Peripheral Edge (Handle) |
| 66 | Aperture (Handle) |
| 68 | Light Guides (Handle) |
| 72 | Opening (Handle) |
| 74 | Battery Door |
| 76 | Batteries |
| 78 | Light Chamber |
| 82 | Angled Surfaces (Chamber) |
| 84 | Batter Compartments |
| 100 | Variable Focus Assembly |
| 110 | Circuit Board |
| 112 | Housing |
| 114 | Cavity |
| 116 | Cradle for Lens |
| 118 | Cradle Axle |
| 120 | Axle Slots in Housing |
| 122 | Sidewalls |
| 124 | Lens |
| 126 | Lens Cap |
| 128 | Clevis |
| 132 | Clevis Axle |
| 134 | Axle Mounts in Housing |
| 136 | Axle Mounts in Clevis |
| 138 | Actuator |
| 142 | Actuator Spring |
| 144 | Set Screw |
| 148 | Sensor |
| "O" | Object being Viewed |
| "F" | Focus distance |

DETAILED DESCRIPTION OF THE PREFERRED EMBODIMENT

The present invention relates to a magnifier device for use by blind or low vision users. The magnifier includes a camera that can display enlarged images of target objects for viewing by the user. The magnifier device further includes a handle that is pivotally interconnected to a housing to thereby allow the device to be configured in a number of different configurations. The various features of the present invention, and the manner in which they interrelate, will be described in greater detail hereinafter.

With reference to FIGS. 1-4, the housing 22 and interconnected handle 24 of the magnifier 20 are illustrated. These components are preferably formed from an impact resistant plastic, such as an acrylonitrile butadiene styrene (ABS) plastic, or an equivalent thereof. Handle 24 and housing 22 are engaged with one another about an axis to thereby permit rotation of handle 24. As noted more fully hereinafter, magnifier 20 takes on various configurations based upon the angle of handle 24.

Figures 1, 2:
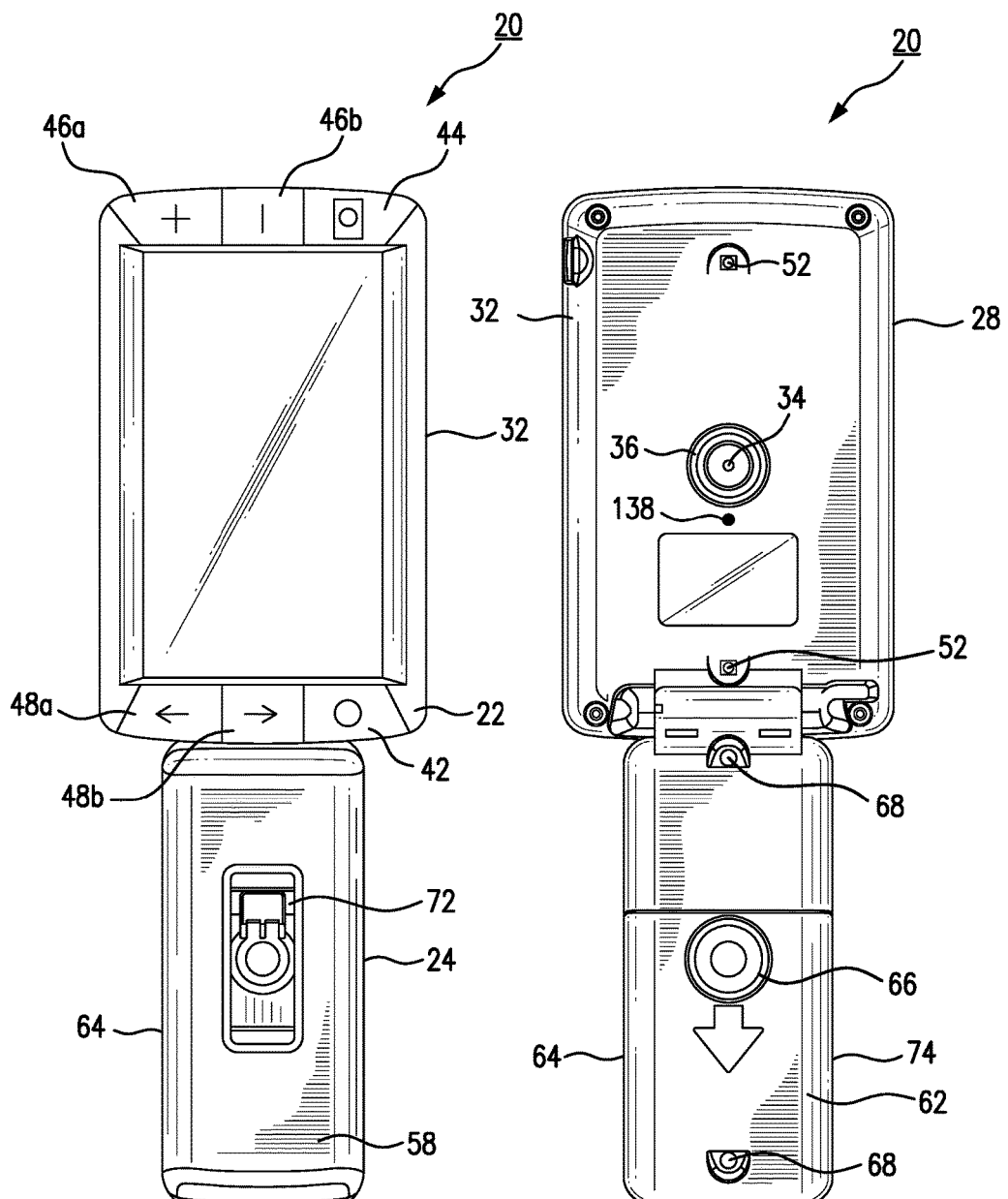
FIG. 1 is front plan view of the magnifier of the present invention.
FIG. 2 is a back plan view of the magnifier of the present invention.

Housing 22 is defined by front and back faces (26 and 28, respectively) and an associated peripheral edge 32. With reference to FIG. 2, the camera for use with the magnifier is depicted. In the preferred embodiment, camera is a high definition CMOS sensor 34. Such sensors are commercially available and those of ordinary skill in the art will appreciate suitable equivalents thereto. With continuing reference to FIG. 2, it is seen that the sensor 34 includes a lens aperture that is aligned with an aperture 36 on the back face 28 of housing 22. The output from sensor 34 is supplied to an image processor. Additionally, images captured by sensor 34 can be stored in non-volatile memory to be recalled later by the user. The images can be processed by the imaging method described in commonly owned and co-pending application entitled "System and Method for Imaging Objects" (app. No. 61/099,185) filed on Sep. 22, 2008. The contents of this co-pending application are fully incorporated herein.

Stored images, or images currently viewed with sensor 34, can be displayed on screen 38. In the depicted embodiment, an LCD screen 38 is employed. Screen 38 is ideally recessed within front face 26 of housing 22. As such, a peripheral edge 32 is inwardly beveled. The LCD screen 38 is a color display. Low-voltage differential signaling (LVDS) or parallel low voltage CMOS signaling can be used to interconnect the LCD screen 38 to the image processor as noted above. This arrangement ensures a purely digital output on LCD screen 38 and also permits magnifier 20 to be used with an external monitor (not shown). Thus, by way of the LCD screen 38, objects within range of sensor 34 can be selectively displayed and digitally enlarged for the blind or low-vision user.

With reference to FIG. 1, the magnifier controls are illustrated. Controls are included for: power 42, camera/sensor 44, zoom 46, and mode 48. Power button 42 is used to turn the device 20 on and off. Camera button 44 is used to take "snap shots" of the object being viewed. Depressing the control the captures the images and stores it in memory for later viewing. Zoom button 46 is used to change the magnification employed by sensor 34. For instance, by cycling zoom button 46, the user can select a suitable magnification level. In the preferred embodiment, magnification between 5× to 15× are possible. Finally, mode control 48 can be used to change the color combinations displayed upon screen 38. For instance, the screen can display objects in various color combinations, such as blue/green, red/yellow, or black/white. These color combinations can be cycled through until the user finds the mode effective output.

Figure 9:
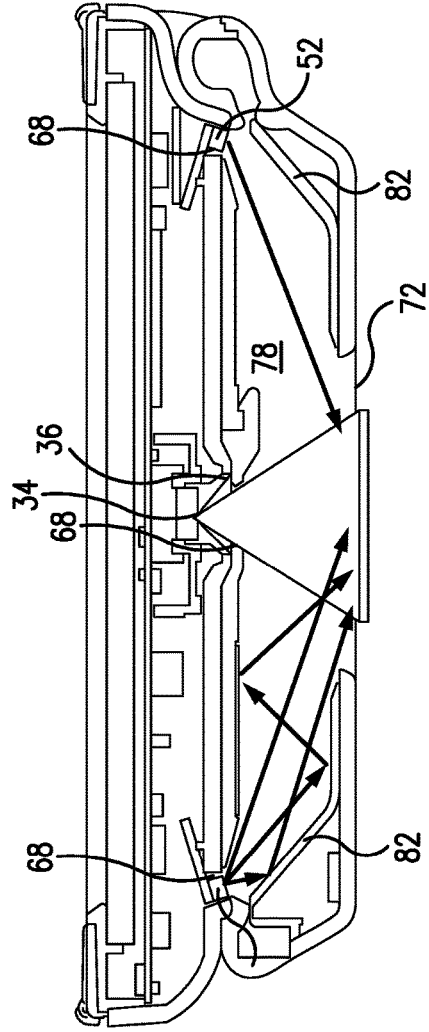
FIG. 9 is a cross sectional view showing the internal light chamber of the handle.
Figure 10:
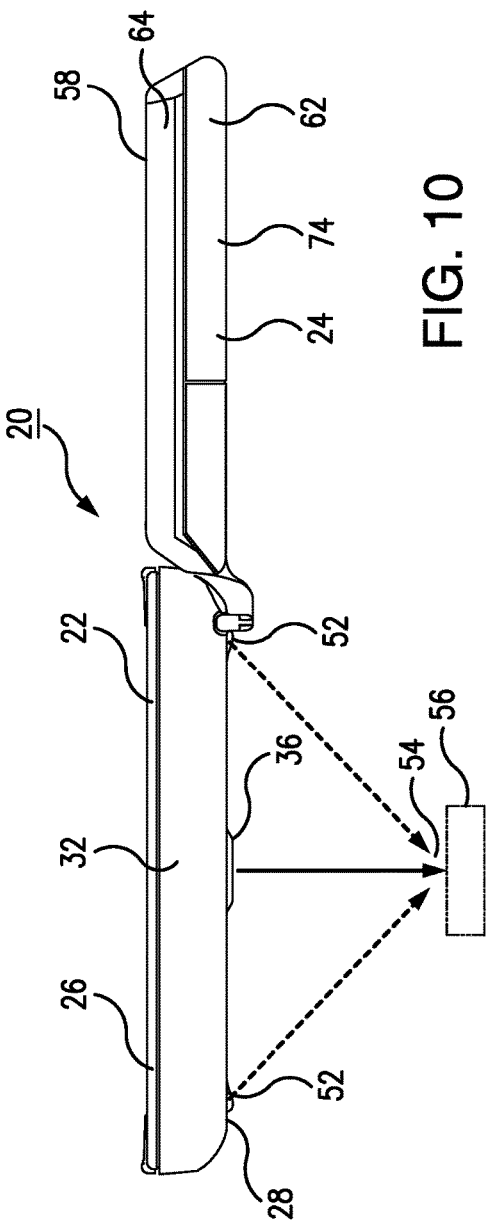
FIG. 10 is a side view of the magnifier illustrating the light being directed to a focal point beneath the housing.

Light sources are also mounted to back face 28 of housing 22. In the preferred embodiment, these light sources are light emitting diodes (LEDs) 52. Other light sources can alternatively be used. With particular reference to FIGS. 9 and 10, it can be seen that LEDS 52 are preferably mounted at an angle relative to the plane of housing 22. The depicted angle is approximately 45°. The back face 28 is raised about the LEDs 52 to thereby shield the LEDs 52 from damage. As illustrated, LEDs 52 are angled such that the emitted light emitting converges on a focal point 54. Preferably, focal point 54 is located at or near the object being viewed 56. LEDs 52 can be selectively illuminated depending upon ambient lighting conditions.

Figure 11:
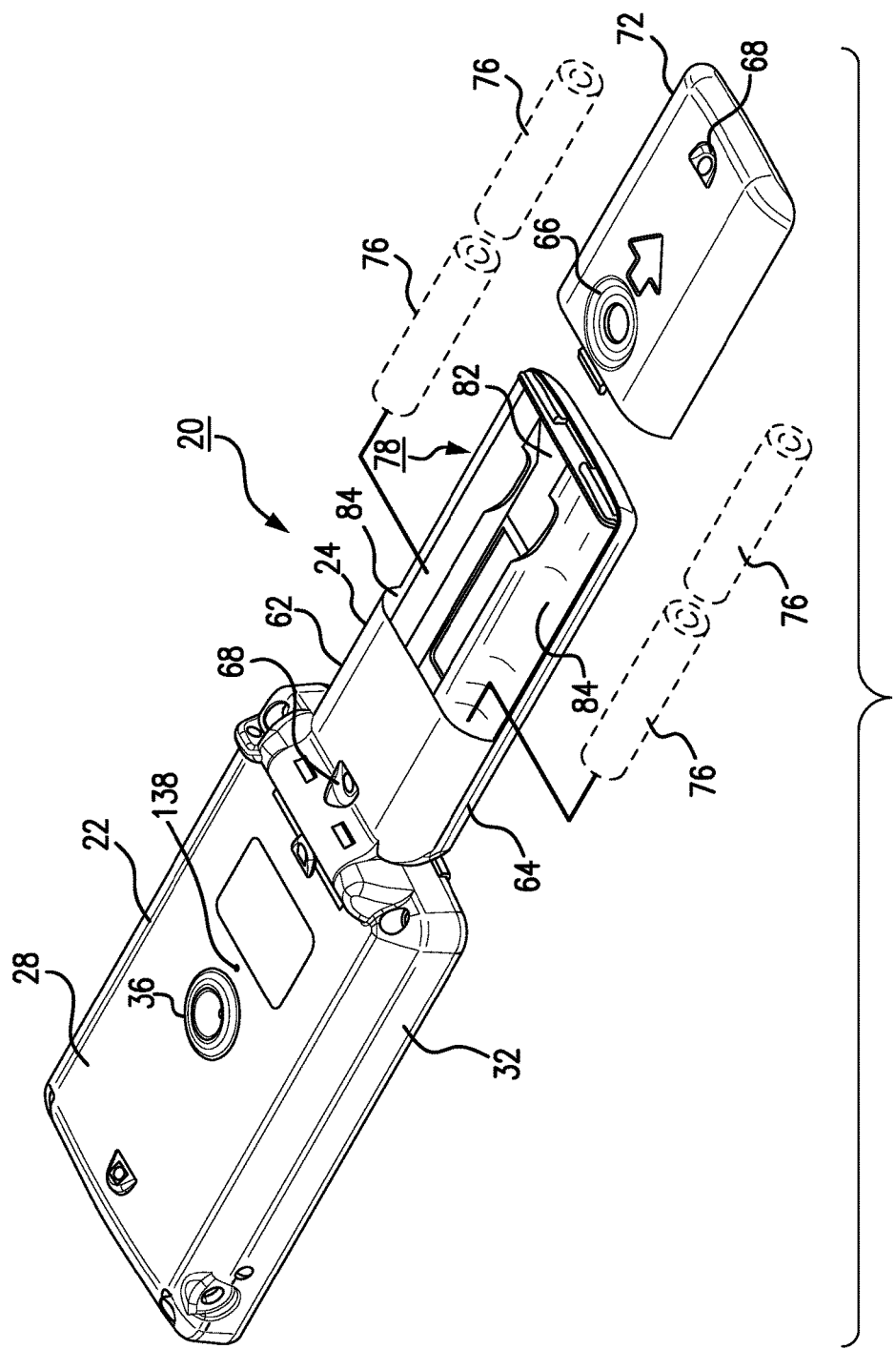
FIG. 11 is a perspective and partially exploded view of the magnifier camera with the battery cover removed.
Figure 12:
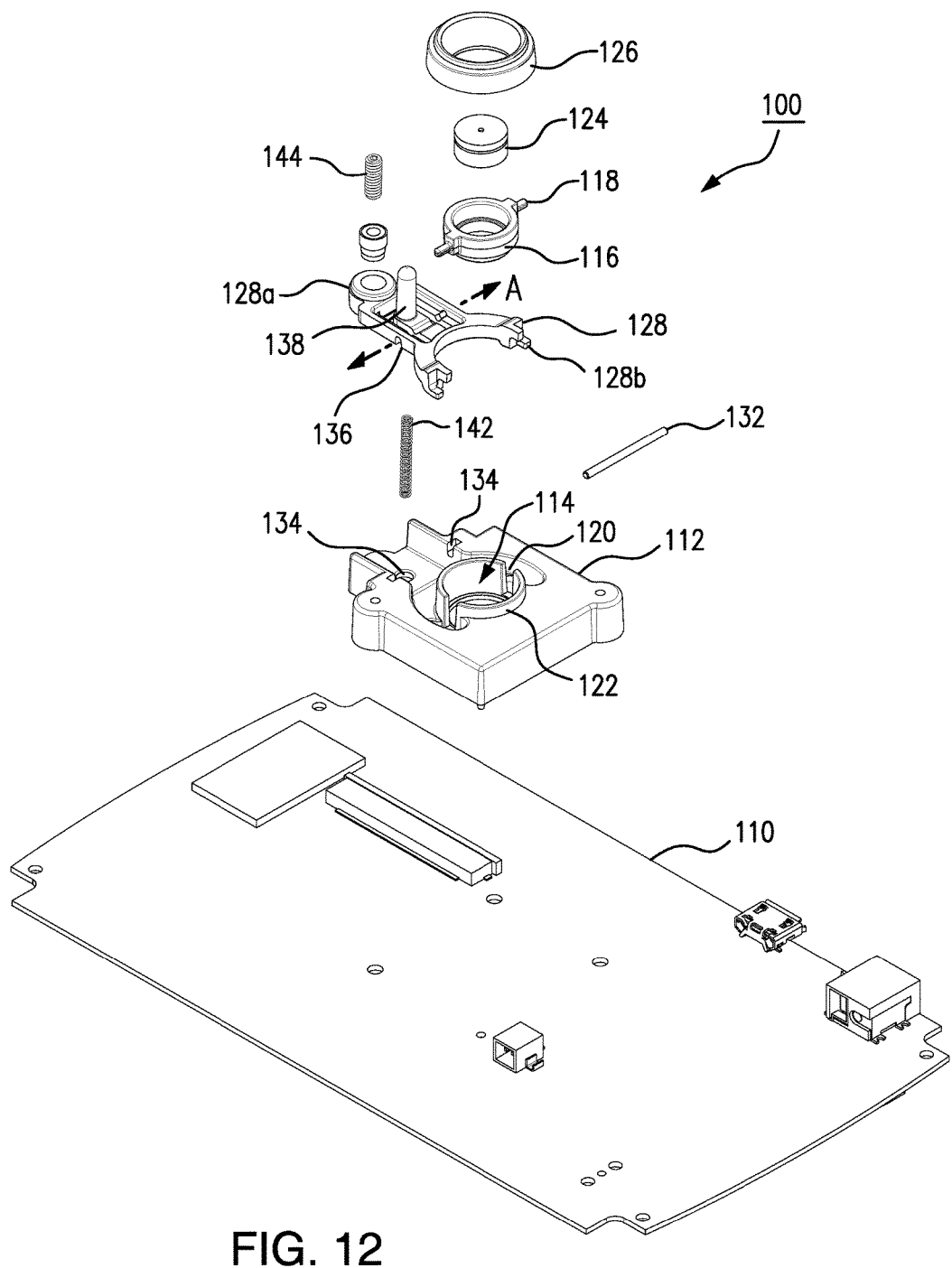
FIG. 12 is a perspective and partial exploded view of the variable focus assembly.
Figure 13:
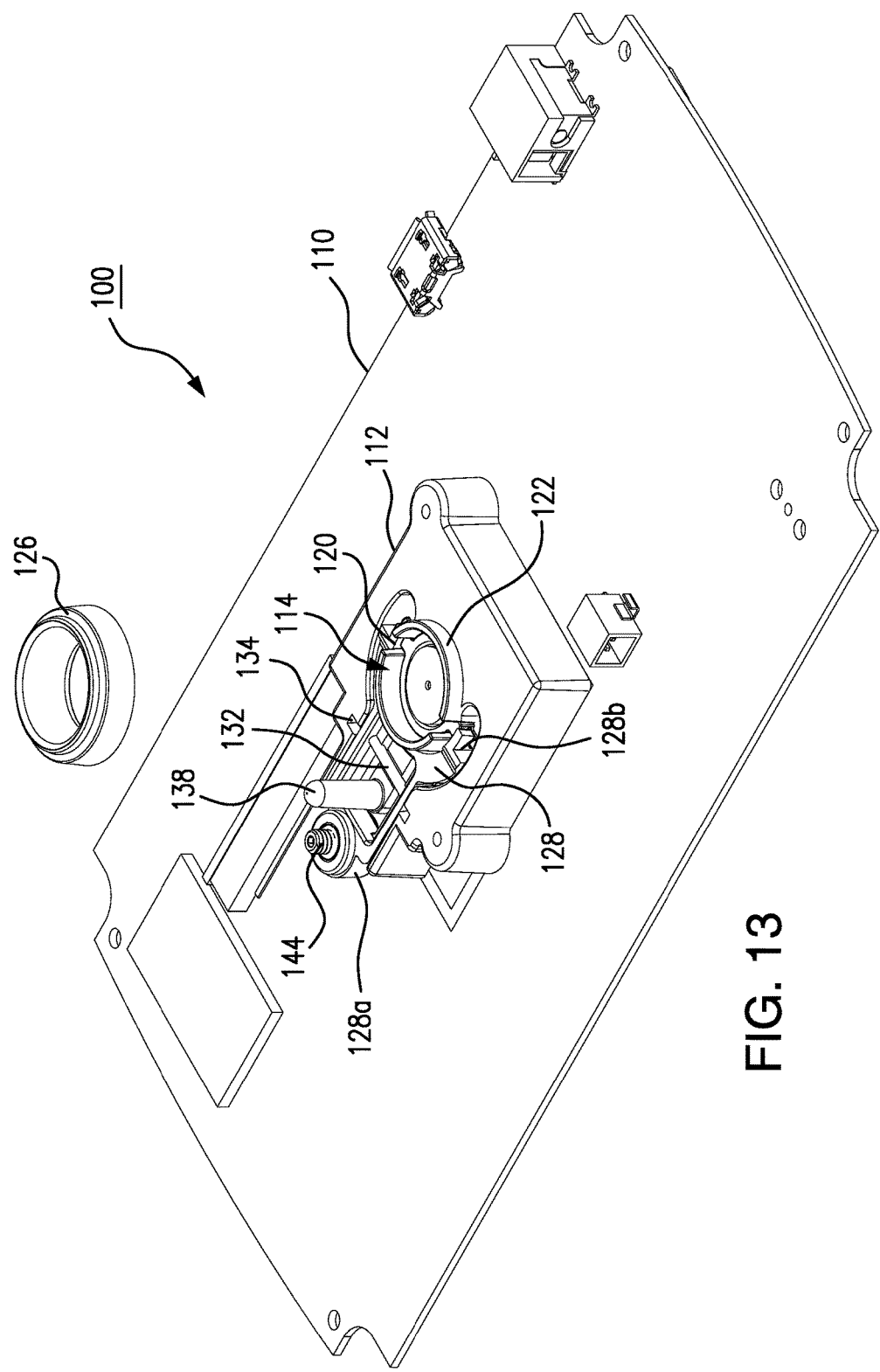
FIG. 13 is a perspective view of the variable focus assembly.
Figure 14:
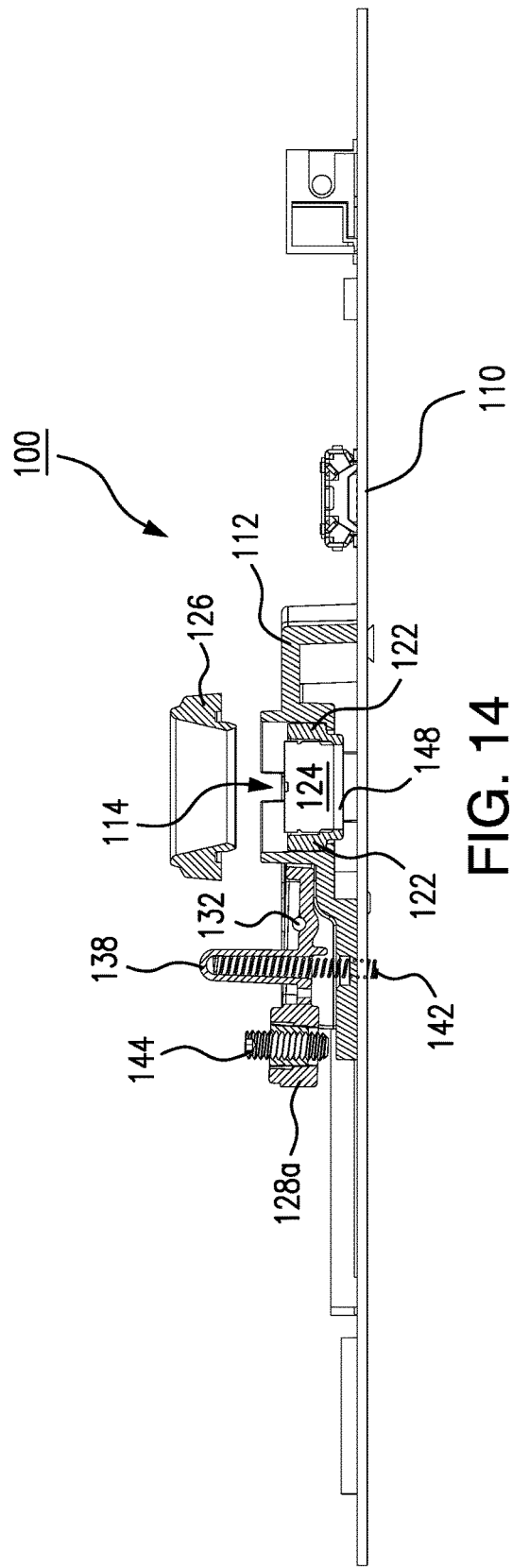
FIG. 14 is a side elevational view of the variable focus assembly.

With reference again to FIGS. 1-4, handle 24 of the device 20 is described. Handle 24 is defined by a front face 58, a back face 62, and a peripheral edge 64 therebetween. An aperture 66 and a pair of light guides 68 are formed within back face 62. Additionally, an opening 72 formed is within front face 58 and is positioned such that it is in alignment with aperture 66. As noted in FIG. 11, handle 24 further includes a battery door 74. The edges of battery door 74 are designed to slide into corresponding grooves within the peripheral edges 64 of handle 24. Door 74 serves to enclose batteries 76 that are positioned within handle 24 and which power device 20. In the depicted embodiment, four "AAA" batteries 76 are use.

Figures 3, 4:
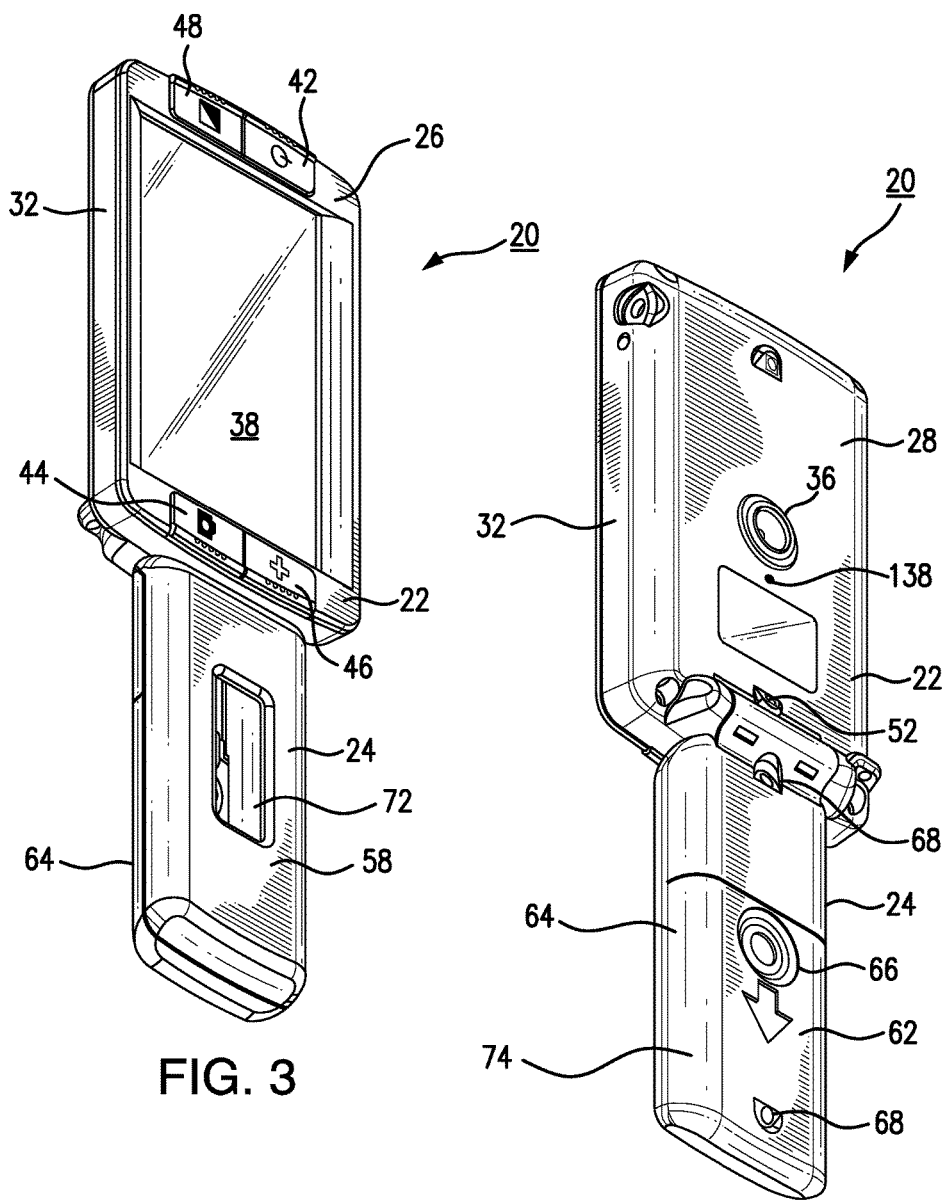
FIG. 3 is a perspective view of the front of the magnifying apparatus.
FIG. 4 is a perspective view of the back of the magnifying apparatus.

Handle 24 also includes an internal light chamber 78. Chamber 78 is most easily seen in the cross sectional view of FIG. 9. As described more fully hereinafter, light chamber 78 directs light from LEDs 52 to the object being viewed 56. One suitable light chamber is described in commonly owned U.S. Pat. No. 7,172,304 to Rodriguez et. al., the contents of which are fully incorporated herein. Whatever type of light chamber is utilized, it should include angled surfaces that are lightly colored to promote maximum light reflection and diffusion. In the preferred embodiment, light chamber 78 is white and includes angled surfaces 82 that are positioned immediately below light guides 68. With continuing reference to FIG. 4, it is seen that battery compartments 84 are positioned on either side of light chamber 78.

By pivoting handle 24 with respect to housing 22, magnifier 20 can be brought into a number of different orientations. The user can select the desired orientation for optimal viewing. The various magnifier orientations are described below in connection with FIGS. 5-8.

First Orientation

The first orientation of the magnifier 20 is depicted in FIG. 1. This orientation is defined by housing 22 and handle 24 being in alignment with one another. Namely, the angle between housing 22 and handle 24 is 180°, or approximately 180°. This orientation is preferred when magnifier 20 is used to view objects 56 at a distance or when the user otherwise does not need both hands free. In the orientation, the user holds magnifier 20 by grasping handle 24 and pointing sensor 34 at an object 56. The user's free hand can then be used to operate the controls to, for example, zoom in on the object (button 46), or take a snap shot (button 44). In this orientation, objects are viewed through the bottom of housing 22, while handle 24 is used to grasp the device 20.

Second Orientation

The second orientation of the magnifier 20 is depicted in FIG. 8. Here, handle 24 and housing 22 are positioned at an angle of less than 180°. In the depicted embodiment, housing 22 is positioned at a 45° angle relative to handle 24. When so configured, handle 24 can be positioned upon a surface, such as a table, and objects 56 can be placed in front of camera 34. Magnifier 20 can maintain this position because handle 24 is substantially heavier than housing 22 insomuch as handle 24 houses batteries. By positioning the device 20 on a table, the user is free to use both hands, as may be preferred if the object 56 needs to be manipulated in front of camera sensor 34. Thereafter, the user can utilize the controls to zoom in (button 46) and capture desired images (camera button 44).

Third Orientation

FIG. 7 illustrates the third orientation. Here, the back faces (28, 62) of the housing and handle (22, 24) are brought together, such that they are in facing relation to one another. In other words, the angle between housing 22 and handle 24 is 0°, or approximately 0°. This orientation is preferred when magnifier 20 is to be positioned directly over an object 56. This includes resting magnifier 20 directly upon a flat object 56 such as a document. In this configuration, sensor 34 is viewing the object through the aperture 36 in housing 22, as well as aperture and opening (66, 72) in handle 24. Furthermore, in the third orientation, the LEDs 52 are brought into registry with light guides 68 in handle 24. Thus, LEDs 52 direct light through light guides 68, into light chamber 78, and out through opening 72. In this manner, LEDs 52 can effectively illuminate the object being viewed 56.

Variable Focus Assembly

The variable focus assembly 100 is next described in connection with FIGS. 12-17. As illustrated, assembly 100 is mounted upon a circuit board 110 within the interior of housing 22. A lens housing 112, with a cavity 114, is mounted upon circuit board 110. Cavity 114 is dimensioned to receive a lens cradle 116. Cradle 116 includes opposing axles 118 that move within slots 120 formed within housing 112. This arrangement allows lens cradle 116 to pivot about axles 118 in a manner more fully described hereinafter. Housing 112 includes opposing sidewalls 122 that restrain the pivotal movement of cradle 116 as it moves up and down.

Optical lens 124 is positioned within lens cradle 116. Optical lens 124 is in registration with aperture 66. A lens cap 126 is preferably secured over the lens 124 to both protect and prevent removal of lens 124. The movement of both lens 124 and lens cradle 116 is achieved via a pivotal clevis 128. Clevis 128 has rearward and forward ends (128a and 128b). Forward end 128b of clevis 128 has two opposing arms that are pivotally connected to the axles 118 of cradle 116. The rearward end 128a of clevis 128 includes a threaded opening. Clevis 128 is pivotally mounted within housing 112 about an axis "A." This is accomplished by a clevis axle 132 that is secured within axle mounts 136 within clevis 128 and axle mounts 134 within housing 112.

The pivotal movement of clevis 128 is achieved via an actuator 138. Actuator 138 is biased upwardly via an actuator spring 142. Spring 142 is configured such that clevis 128 is biased to position cradle 118 and lens 124 in a seated position within cavity 114. However, depressing actuator 138 overcomes the bias of spring 142 to move rearward end 128a of clevis 128 downwardly and the forward end 128b upwardly. Lens 124 and cradle 116 move upwardly along with forward end 128b. A set screw 144 is threadably received within the rearward end 128a of clevis 128. Set screw 144 extends through the threaded opening in rearward end 128a. Screw 144 can be adjustably positioned to limit the pivotal movement of the clevis 128. Driving screw 144 further into opening lessens the degree of pivotal movement by clevis 128. A sensor 148 is positioned within housing 112 and in optical registry with lens 124. This may be a high definition CMOS sensor. Actuator 138 can be depressed to move lens 124 closer to the object being viewed. This also has the desired effect of increasing the focus distance "F," which is the distance between lens 124 and sensor 148.

Actuator 138 is positioned and configured to be depressed by back face 62 of handle 24. Namely, as device 20 is brought into the third orientation (note FIG. 7), back face 62 contacts and depresses actuator 138. As actuator 138 is depressed, clevis 128 is pivoted about axis "A." This, in turn, moves lens 124 and lens cradle 118 closer to the object "O" being viewed. It also increases the focus distance "F" by increasing the distance between lens 124 and sensor 148. This is the preferred optical configuration for viewing closely positioned objects. This movement occurs with the face of lens 124 staying parallel to the face of sensor 148. Namely, as lens 124 moves upwardly, sidewalls 122 ensure that lens 124 does not pivot with respect to sensor 148 or object "O." Nonetheless, axles 118 permit cradle 116 to pivot with respect to clevis 128. Thereafter, once handle 24 is pivoted to the first or second orientations (FIG. 6 or FIG. 8), actuator 138 is released and lens 124 and cradle 116 take a seated position within cavity 114. This decreases the focus distance "F." This is the preferred optical configuration for viewing more distant objects.

Although the present invention discloses a purely mechanical system for varying the focus distance "F," it can also be carried out electrically or via an electro-mechanical system. Namely, a microprocessor can be included to determine the focus of the object "O." Based upon the output of the microprocessor, lens 124 can be moved a corresponding distance to maintain focus.

Figure 15:
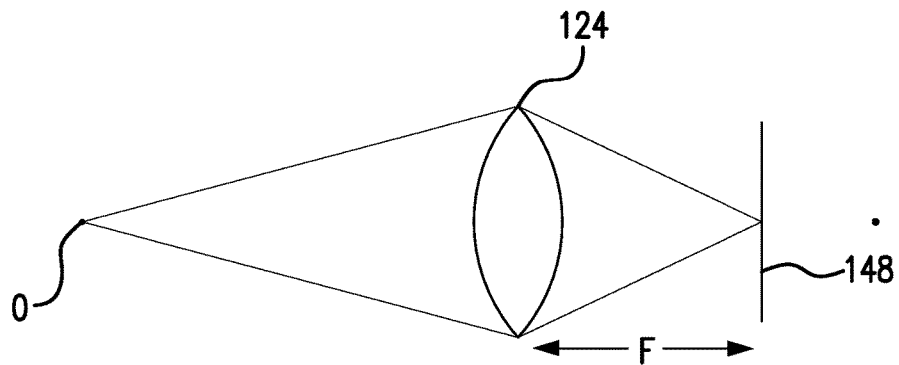
FIGS. 15-17 are diagrams illustrating depth of field and variable focus.
Figure 16:
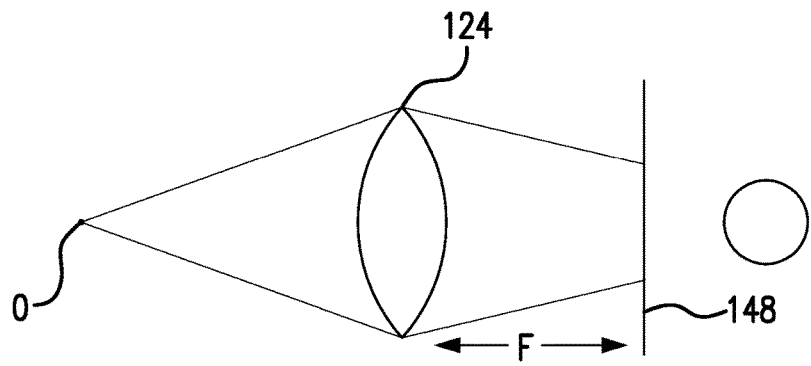
Figure 17:
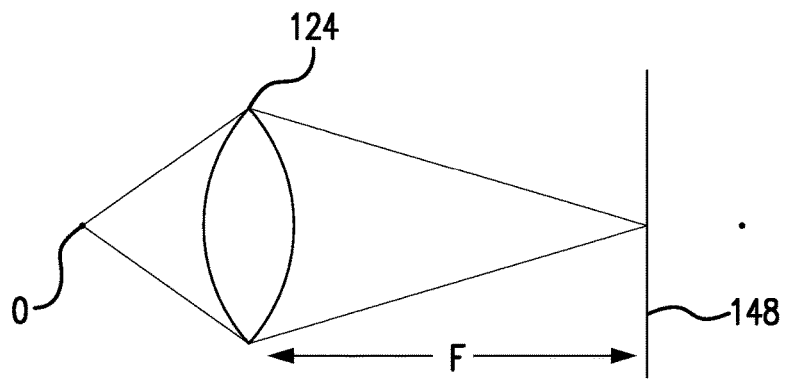

With reference to FIG. 15, it can be seen that the focus distance "F" is the distance between lens 124 and associated sensor 148. In order for object "O" to be in focus, light from lens 124 must converge at a point source upon sensor 148. As noted in FIG. 16, given the same focus distance "F" a closer object "O" will be out of focus. In other words, the light from lens 124 no longer converges at sensor, but instead is truncated to form a larger circle upon sensor 148. FIG. 17 shows that object "O" can be brought back into focus by moving lens 124 closer to object "O" and further away from sensor 148, thereby increasing focus distance "F." By mechanically increasing focus distance "F," a greater perceived depth of field can be achieved. Moreover, this perceived increase in depth of field can be achieved while still utilizing a lens 124 that has a fixed focal length.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A focus assembly for a magnification device, the assembly comprising:
    a housing with front and rear surfaces, a display screen within the front surface, a camera opening within the rear surface, the housing being pivotally connected to a handle, the housing and handle having a number of discrete orientations, including a first orientation wherein the handle is folded against the rear surface of the housing;
    a CMOS sensor and a lens positioned within the housing, the CMOS sensor and lens being in registry with the camera opening, the distance between the CMOS sensor and lens constituting a focus distance;
    a pivotal clevis assembly positioned within the housing, the clevis having forward and rearward ends and a pivot point therebetween, the clevis having a pivotal range of movement, a biased actuator positioned at the rearward end of the clevis, the actuator having a distal end that extends through a surface of the housing, a lens cradle interconnected to the forward end of the clevis, the lens positioned within the lens cradle, an adjustment screw positioned within the rearward end of the clevis for selectively adjusting the pivotal range of movement;
    whereby when the housing and handle are in the first orientation the actuator is depressed and the clevis is pivoted such that the lens moves towards the camera opening.

2. A focus assembly for a magnification device, the assembly comprising:
    a housing having a camera opening;
    a sensor and a lens positioned within the housing, the sensor and lens being in registry with the camera opening, the distance between the optical sensor and lens being adjustable;
    a pivotal clevis assembly positioned within the housing, the clevis having forward and rearward ends and an axle therebetween, an actuator positioned at the rearward end of the clevis, the actuator having a distal end that extends through a surface of the housing, the lens being interconnected to the forward end of the clevis;
    whereby when the actuator is depressed the clevis is pivoted such that the lens moves towards the camera opening.

3. The focus assembly as described in claim 2 wherein the lens has a fixed focal length.

4. The focus assembly as described in claim 2 further comprising a lens cradle that is interconnected to the forward end of the clevis about an axis, the lens positioned within the lens cradle, whereby the axis permits the pivotal movement of the lens cradle and keeps the lens parallel to the optical sensor.

5. The focus assembly as described in claim 2 wherein the assembly further comprises a handle pivotally secured to the housing, and wherein the housing and handle has a first orientation wherein the handle and housing are in alignment, a second orientation wherein the handle and housing are angled with respect to one another, and a third orientation wherein the handle is folded against the rear surface of the housing.

6. The focus assembly as described in claim 2 further comprising a set screw position within the rearward end of the clevis, whereby the set screw can be positioned to selectively adjust the pivotal movement of the clevis.

7. A handheld electronic magnifier having a variable focus distance, the magnifier comprising:
    a housing and a handle that are pivotally connected to one another, a collapsed orientation wherein the handle is folded back onto the housing;
    a lens and sensor positioned within the housing, a mechanism for increasing the distance between the lens and sensor in the collapsed orientation.

8. The magnifier as described in claim 7 wherein the mechanism is a device for pivotally securing the lens within the housing.

* * * * *